(12) United States Patent
Yazaki et al.

(10) Patent No.: US 11,502,581 B2
(45) Date of Patent: Nov. 15, 2022

(54) MOTOR UNIT

(71) Applicants: HONDA MOTOR CO., LTD., Tokyo (JP); Hitachi Automotive Systems, Ltd., Hitachinaka (JP)

(72) Inventors: Manabu Yazaki, Wako (JP); Keiichiro Kashiwabara, Wako (JP); Tomoyuki Suzuki, Wako (JP); Heisuke Kobayashi, Wako (JP); Takeshi Hoshinoya, Wako (JP); Sachio Kawada, Hitachinaka (JP); Akira Fujiwara, Hitachinaka (JP); Yasuyuki Saito, Hitachinaka (JP); Hiroshi Hamano, Hitachinaka (JP); Tsuyoshi Harada, Hitachinaka (JP)

(73) Assignees: HONDA MOTOR CO., LTD., Tokyo (JP); Hitachi Automotive Systems, Ltd., Hitachinaka (JP)

( * ) Notice: Subject to any disclaimer, the term of this patent is extended or adjusted under 35 U.S.C. 154(b) by 64 days.

(21) Appl. No.: 16/813,925

(22) Filed: Mar. 10, 2020

(65) Prior Publication Data
US 2020/0295629 A1 Sep. 17, 2020

(30) Foreign Application Priority Data
Mar. 12, 2019 (JP) .............................. JP2019-045187

(51) Int. Cl.
*H02K 11/00* (2016.01)
*H02K 5/04* (2006.01)
(Continued)

(52) U.S. Cl.
CPC ........... *H02K 11/0094* (2013.01); *H02K 5/04* (2013.01); *H02K 5/203* (2021.01); *H02K 9/00* (2013.01); *H02K 11/33* (2016.01); *H02K 16/00* (2013.01)

(58) Field of Classification Search
CPC ...... H02K 5/20; H02K 11/33; H02K 11/0094; H02K 9/00; H02K 11/30; H02K 16/00;
(Continued)

(56) References Cited

U.S. PATENT DOCUMENTS

| 4,164,852 A | 8/1979 | Anzalone |
| 6,198,183 B1 | 3/2001 | Baeumel et al. |
(Continued)

FOREIGN PATENT DOCUMENTS

| CN | 1371542 | 9/2002 |
| EP | 1211784 | 6/2002 |
(Continued)

OTHER PUBLICATIONS

Chinese Office Action for Chinese Patent Application No. 202010161431.1 dated Jan. 21, 2022.
(Continued)

*Primary Examiner* — Alexander A Singh
(74) *Attorney, Agent, or Firm* — Amin, Turocy & Watson, LLP

(57) ABSTRACT

Disclosed is a motor unit that includes: a rotary electrical machine that has a cylindrical stator, a rotor disposed coaxially with the stator, a shaft disposed coaxially with the rotor, and a cylindrical case that houses the stator and the rotor; and a drive unit that has a swell swelling toward the case and is fixed to a circumferential surface that is located in a radial direction of the rotor and is the case. The case has a recess that corresponds to the swell.

4 Claims, 4 Drawing Sheets

(51) Int. Cl.
*H02K 9/00* (2006.01)
*H02K 5/20* (2006.01)
*H02K 11/33* (2016.01)
*H02K 16/00* (2006.01)

(58) Field of Classification Search
CPC ........ H02K 11/00; H02K 11/35; H02K 11/38; H02K 11/40; H02K 1/20; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22; H02K 9/227
USPC ............ 310/112, 49.06, 49.29, 49.38, 49.39, 310/49.51, 59, 101, 114, 134, 154.33, 89
See application file for complete search history.

(56) References Cited

U.S. PATENT DOCUMENTS

| | | | |
|---|---|---|---|
| 8,875,825 B2* | 11/2014 | Asakura | B60K 6/405 180/68.4 |
| 2002/0077209 A1 | 6/2002 | El-Antably et al. | |
| 2003/0206815 A1 | 11/2003 | Iritani | |
| 2007/0231165 A1* | 10/2007 | Koide | F04B 39/121 417/410.1 |
| 2012/0134856 A1* | 5/2012 | Wu | F04D 19/002 417/350 |
| 2013/0076174 A1 | 3/2013 | Wibben et al. | |
| 2018/0026493 A1* | 1/2018 | Jung | H02K 5/20 310/52 |

FOREIGN PATENT DOCUMENTS

| | | |
|---|---|---|
| JP | 07-143705 | 6/1995 |
| JP | 09-285056 | 10/1997 |
| JP | 2002-191153 | 7/2002 |
| KR | 10-2015-0062529 | 6/2015 |

OTHER PUBLICATIONS

Chinese Office Action for Chinese Patent Application No. 202010161431.1 dated Aug. 10, 2022.

* cited by examiner

MOTOR UNIT

CROSS-REFERENCE TO RELATED APPLICATION

Priority is claimed on Japanese Patent Application No. 2019-045187, filed Mar. 12, 2019, the content of which is incorporated herein by reference.

BACKGROUND OF THE INVENTION

Field of the Invention

The present invention relates to a motor unit.

Description of Related Art

In a rotary electrical machine mounted, for instance, in a hybrid vehicle or an electric vehicle, an electric current is supplied to a coil. Thereby, a magnetic field is formed at a stator core, and a magnetic attractive or repulsive force is generated between a rotor (e.g., a magnet rotor, a salient pole rotor, or a cage rotor) and the stator core. Thus, the rotor rotates relative to the stator.

For example, a motor having a drive unit such as an inverter is disclosed in Japanese Unexamined Patent Application, First Publication No. H09-285056. In Japanese Unexamined Patent Application, First Publication No. H09-285056, the drive unit is mounted on a circuit board in the motor, and the circuit board is connected to a terminal of a coil end.

SUMMARY OF THE INVENTION

However, since the drive unit is disposed parallel to the terminal of the coil end in an axial direction, there is a possibility of the motor being made large in the axial direction.

For this reason, there is room for improvement in view of miniaturization of the motor.

An aspect according to the present invention was made in view of the above circumstances, and is directed to providing a motor unit capable of realizing miniaturization.

To solve the above problem to achieve the relevant object, the present invention adopts the following aspects.

(1) A motor unit according to an aspect of the present invention includes: a rotary electrical machine that has a cylindrical stator, a rotor disposed coaxially with the stator, a shaft disposed coaxially with the rotor, and a cylindrical case that houses the stator and the rotor; and a drive unit that has a swell swelling toward the case and is fixed to a circumferential surface that is located in a radial direction of the rotor and is the case. The case has a recess that corresponds to the swell.

(2) In the aspect (1), the case may further include a refrigerant passage that cools the stator from an inner circumferential surface of the case, and the refrigerant passage may be disposed away from the recess.

(3) In the aspect (1) or (2), the swell may be provided near an end of the rotary electrical machine in an axial direction.

(4) A motor unit according to another aspect of the present invention includes: a first rotary electrical machine that has a cylindrical first stator, a first rotor disposed coaxially with the first stator, a first shaft disposed coaxially with the first rotor, and a cylindrical first case that houses the first stator and the first rotor; a second rotary electrical machine that has a cylindrical second stator, a second rotor disposed coaxially with the second stator, a second shaft disposed coaxially with the second rotor, and a cylindrical second case that houses the second stator and the second rotor; and a single drive unit that has a swell swelling toward at least one of the first and second cases and is integrally fixed across a side of the first case and a side of the second case. The at least one of the first and second cases has a recess that corresponds to the swell.

(5) In the aspect (4), the first case may include a first refrigerant passage that cools the first stator from an inner circumferential surface of the first case, the second case may include a second refrigerant passage that cools the second stator from an inner circumferential surface of the second case, and the first and second refrigerant passages may be disposed away from the recess.

(6) In the aspect (4) or (5), the first rotary electrical machine and the second rotary electrical machine may be disposed coaxially with each other, and the swell may be provided between the first rotary electrical machine and the second rotary electrical machine in an axial direction.

(7) In any one of the aspects (1) to (6), the drive unit may include a capacitor, at least a part of which is disposed in the swell.

According to the aspect (1), the case has a recess that corresponds to the swell, and thereby the swell (a part of the drive unit) can be incorporated with the case. Therefore, the motor unit can be miniaturized.

According to the aspect (2), the case further includes a refrigerant passage that cools the stator from an inner circumferential surface of the case, and the refrigerant passage is disposed away from the recess. Thereby, the following effect is produced. Since the swell can be incorporated with a portion other than the refrigerant passage in the case, the motor unit can be miniaturized while cooling the stator.

According to the aspect (3), the swell is provided near an end of the rotary electrical machine in an axial direction, and thereby the refrigerant passage is easily secured, compared to a case where the swell is provided in the middle of the rotary electrical machine in an axial direction. For this reason, the motor unit can be easily miniaturized while cooling the stator.

According to the aspect (4), the at least one of the first and second cases has a recess that corresponds to the swell, and thereby the swell (a part of the drive unit) can be incorporated with the at least one of the first and second cases. Therefore, the motor unit having the two rotary electrical machines and the single drive unit can be miniaturized.

According to the aspect (5), the first case includes a first refrigerant passage that cools the first stator from an inner circumferential surface of the first case, the second case includes a second refrigerant passage that cools the second stator from an inner circumferential surface of the second case, and the first and second refrigerant passages are disposed away from the recess. Thereby, the following effect is produced. Since the swell can be incorporated with a portion other than the first refrigerant passage in the first case and a portion other than the second refrigerant passage in the second case, the motor unit can be miniaturized while cooling the first and second stators.

According to the aspect (6), the swell is provided between the first rotary electrical machine and the second rotary electrical machine in an axial direction, and thereby the first refrigerant passage and the second refrigerant passage is easily secured, compared to a case where the swell is provided in the middle of the first rotary electrical machine and in the middle of the second rotary electrical machine in an axial direction. For this reason, the motor unit can be easily miniaturized while cooling the first and second stators.

According to the aspect (7), the drive unit includes a capacitor, at least a part of which is disposed in the swell, and thereby the following effect is produced. Since the capacitor has a high degree of shape freedom, compared to other electronic components, the motor unit can be easily miniaturized.

DETAILED DESCRIPTION OF THE INVENTION

Hereinafter, embodiments of the present invention will be described with reference to the drawings. In the embodiments, a motor unit including a rotary electrical machine (a driving motor) mounted in a vehicle such as a hybrid vehicle or an electric vehicle will be described as an example.

First Embodiment

<Motor Unit 100>

Figure 1:
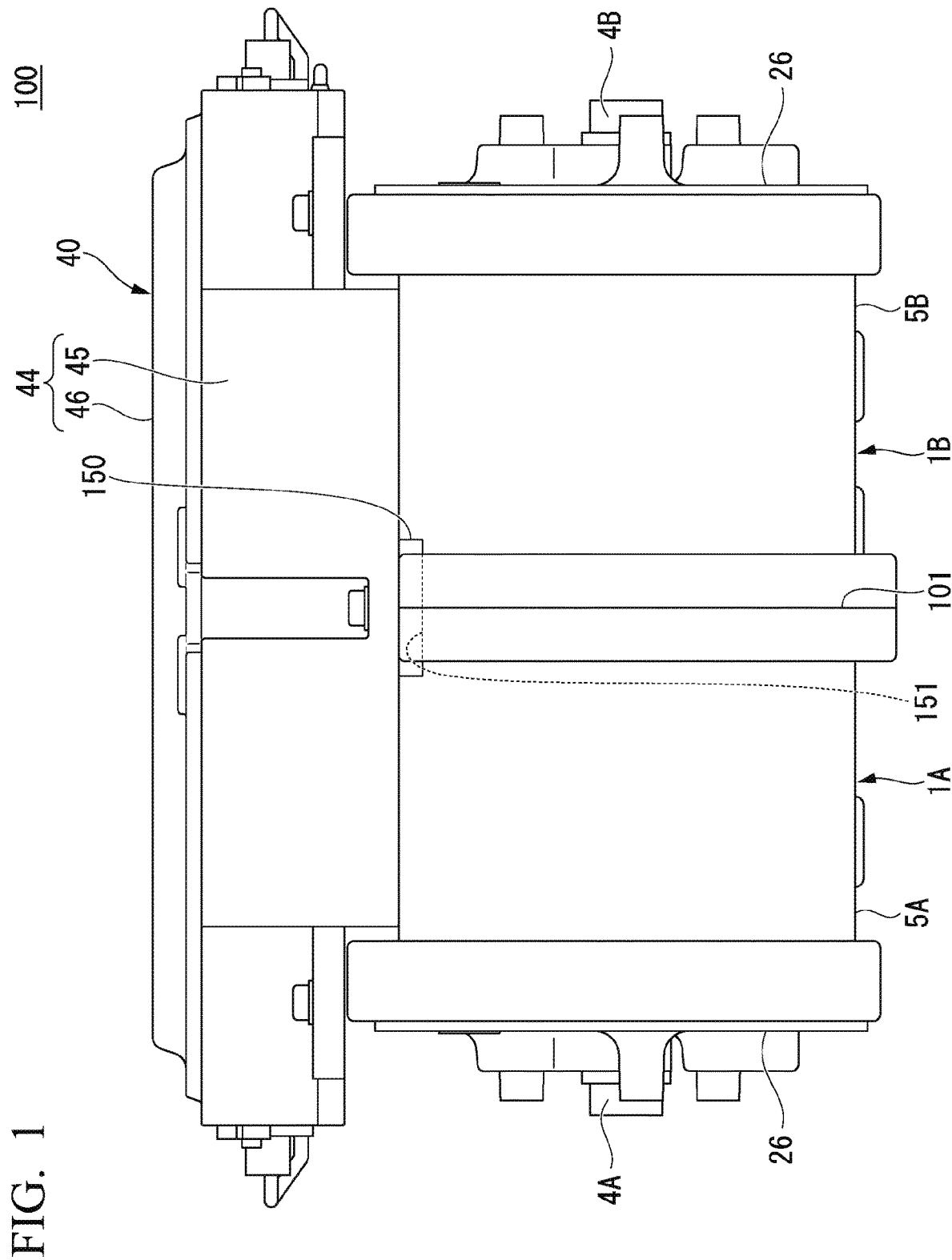
FIG. 1 is a schematic view of a motor unit according to a first embodiment.

FIG. 1 is a schematic view of a motor unit 100 according to a first embodiment.

Figure 3:
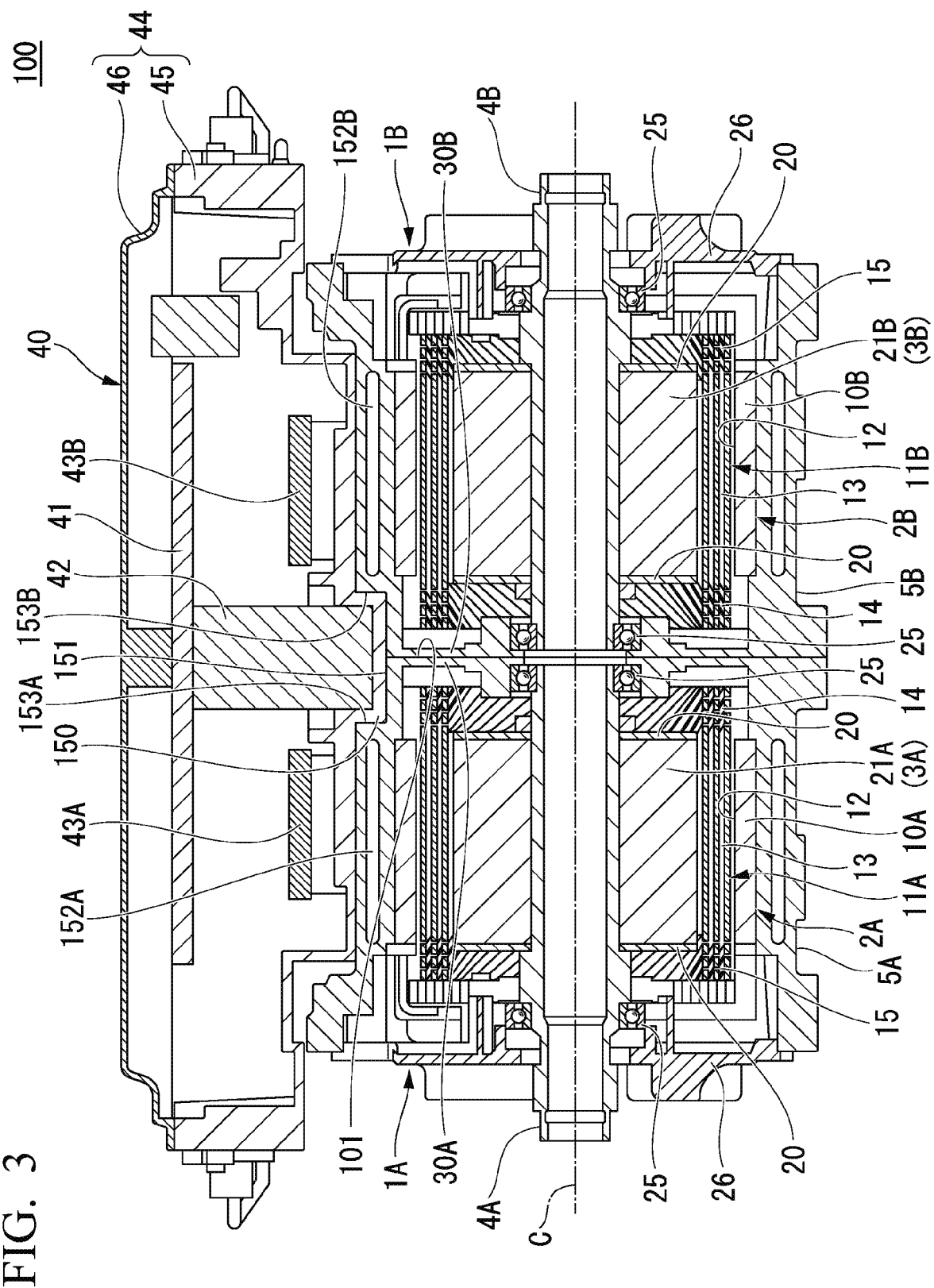
FIG. 3 is a sectional view of the motor unit including cross section III-III of FIG. 2.

As illustrated in FIG. 1, the motor unit 100 is a twin motor unit having two rotary electrical machines 1A and 1B. As illustrated in FIG. 3, the two rotary electrical machines 1A and 1B are a first rotary electrical machine 1A and a second rotary electrical machine 1B disposed coaxially with the first rotary electrical machine 1A. The first rotary electrical machine 1A and the second rotary electrical machine 1B are rotatably disposed independently of each other. Hereinafter, a direction along an axis C of the rotary electrical machine is referred to as "axial direction," a direction perpendicular to the axis C is referred to as "radial direction," and a direction around the axis C is referred to as "circumferential direction."

In the present embodiment, the motor unit 100 is disposed along the axis C in a horizontal direction. In the following description, "A" may be added to the end of the reference sign of a component of the first rotary electrical machine 1A, and "B" may be added to the end of the reference sign of a component of the second rotary electrical machine 1B.

<First Rotary Electrical Machine 1A>

The first rotary electrical machine 1A includes a cylindrical first stator 2A, a first rotor 3A disposed coaxially with the first stator 2A, a first shaft 4A disposed coaxially with the first rotor 3A, and a cylindrical first case 5A that houses the first stator 2A and the first rotor 3A.

<First Stator 2A>

The first stator 2A includes a first stator core 10A and a first coil 11A having a plurality of layers (e.g., a U phase, a V phase, and a W phase) mounted on the first stator core 10A. An electric current flows to the first coil 11A, and thereby the first stator core 10A generates a magnetic field.

The first stator core 10A has a cylindrical shape disposed coaxially with the axis C. The first stator core 10A is fixed to the first case 5A. The first stator core 10A has a plurality of slots 12 disposed in the circumferential direction. For example, the first stator core 10A is formed by stacking a plurality of electromagnetic steel sheets (silicon steel sheets) in the axial direction. The first stator core 10A may be a so-called compacting core obtained by compression molding of a metal magnetic powder (a soft magnetic powder).

The first coil 11A is inserted into the slots 12. The first coil 11A has a plurality of conductors disposed in the circumferential direction. For example, the first coil 11A is a so-called SC winding (a segment conductor coil) in which U-shaped conductors are inserted into the slots 12, one side is used as a closed segment, and the other side is used as an open segment. The first coil 11A includes inserts 13 that are inserted into the slots 12 of the first stator core 10A, a first coil end 14 that protrudes to one side of the first stator core 10A in the axial direction (an inner side of the motor unit 100 in the axial direction), and a second coil end 15 that protrudes to the other side of the first stator core 10A in the axial direction (an outer side of the motor unit 100 in the axial direction).

<First Rotor 3A>

The first rotor 3A is disposed on an inner side in the radial direction with respect to the first stator 2A at an interval. The first rotor 3A is fixed to the first shaft 4A. The first rotor 3A is configured integrally with the first shaft 4A to be rotatable around the axis C. The first rotor 3A includes a first rotor core 21A and magnets (not illustrated). For example, the magnets are permanent magnets. A reference sign 20 in the drawing indicates end face plates that are disposed on opposite ends of the first rotor 3A in the axial direction.

The first rotor core 21A has a cylindrical shape disposed coaxially with the axis C. The first rotor core 21A is formed by stacking a plurality of electromagnetic steel sheets (silicon steel sheets) in the axial direction. The first rotor core 21A may be a so-called compacting core obtained by compression molding of a metal magnetic powder (a soft magnetic powder).

<First Shaft 4A>

The first shaft 4A has a hollow structure that opens in the axial direction. The middle of the first shaft 4A in the axial direction is press-fitted and fixed on an inner side of the first rotor core 21A in the radial direction. Opposite ends of the first shaft 4A in the axial direction are supported in the first case 5A by bearings 25.

<First Case 5A>

The first case 5A has an end wall 30A that is provided at one end of the first shaft 4A. The end wall 30A faces the first coil end 14 in the axial direction. A reference sign 26 in the drawing indicates a cover that is provided at the other end of the first shaft 4A and covers the second coil end 15 in the axial direction.

The first case 5A has a first step 153A that constitutes a recess 151 corresponding to a swell 150 of a drive unit 40, and a first refrigerant passage 152A that cools the first stator 2A from an inner circumferential surface of the first case 5A.

The first step 153A is provided near an end wall 30A (hereinafter referred to as "first end wall 30A") of the first rotary electrical machine 1A.

The first refrigerant passage 152A is disposed away from the recess 151. The first refrigerant passage 152A is disposed along an outer circumferential surface of the first stator core 10A. For example, the first refrigerant passage 152A is a water jacket.

<Second Rotary Electrical Machine 1B>

As illustrated in FIG. 3, the second rotary electrical machine 1B includes a cylindrical second stator 2B, a second rotor 3B that is disposed coaxially with the second stator 2B, a second shaft 4B that is disposed coaxially with the second rotor 3B, and a cylindrical second case 5B that houses the second stator 2B and the second rotor 3B. In the second rotary electrical machine 1B, the same components as in the first rotary electrical machine 1A are given the same reference signs, and detailed description thereof will be omitted.

The second case 5B has an end wall 30B provided at one end of the second shaft 4B. The end wall 30B is in contact with the end wall 30A of the first rotary electrical machine 1A in the axial direction. The end wall 30B is fastened to the end wall 30A of the first rotary electrical machine 1A by fastening members such as bolts. The end wall 30B faces the first coil end 14 in the axial direction.

The second case 5B has a second step 153B that constitutes the recess 151 corresponding to the swell 150 of the drive unit 40, and a second refrigerant passage 152B that cools the second stator 2B from an inner circumferential surface of the second case 5B.

The second step 153B is provided near an end wall 30B (hereinafter referred to as "second end wall 30B") of the second rotary electrical machine 1B.

The second refrigerant passage 152B is disposed away from the recess 151. The second refrigerant passage 152B is disposed along an outer circumferential surface of the second stator core 10B. For example, the second refrigerant passage 152B is a water jacket.

<Contact Face 101>

The motor unit 100 has a contact face 101 on which the first end wall 30A and the second end wall 30B are in contact with each other in the axial direction. The contact face 101 is a junction face (a boundary face) between the first rotary electrical machine 1A and the second rotary electrical machine 1B. The first rotary electrical machine 1A and the second rotary electrical machine 1B have symmetrical structures with a virtual straight line along the contact face 101 as an axis of symmetry. That is, the second rotary electrical machine 1B has a shape that is a mirror image of that of the first rotary electrical machine 1A.

<Recess 151>

The recess 151 is disposed at a position that faces an upper portion of the contact face 101 in the first case 5A and the second case 5B. In a state in which the first end wall 30A and the second end wall 30B are in contact with each other, the first step 153A and the second step 153B form the recess 151 in common. The recess 151 is recessed in a U shape in a sectional view.

<Drive Unit 40>

As illustrated in FIG. 1, the drive unit 40 is integrally fixed across a side of the first case 5A and a side of the second case 5B. The drive unit 40 is a single drive unit that is fixed to the first rotary electrical machine 1A and the second rotary electrical machine 1B. For example, the drive unit 40 is fixed to the first case 5A and the second case 5B by fastening members such as bolts. The drive unit 40 has a swell 150 that swells toward a joint between the first case 5A and the second case 5B.

Figure 2:
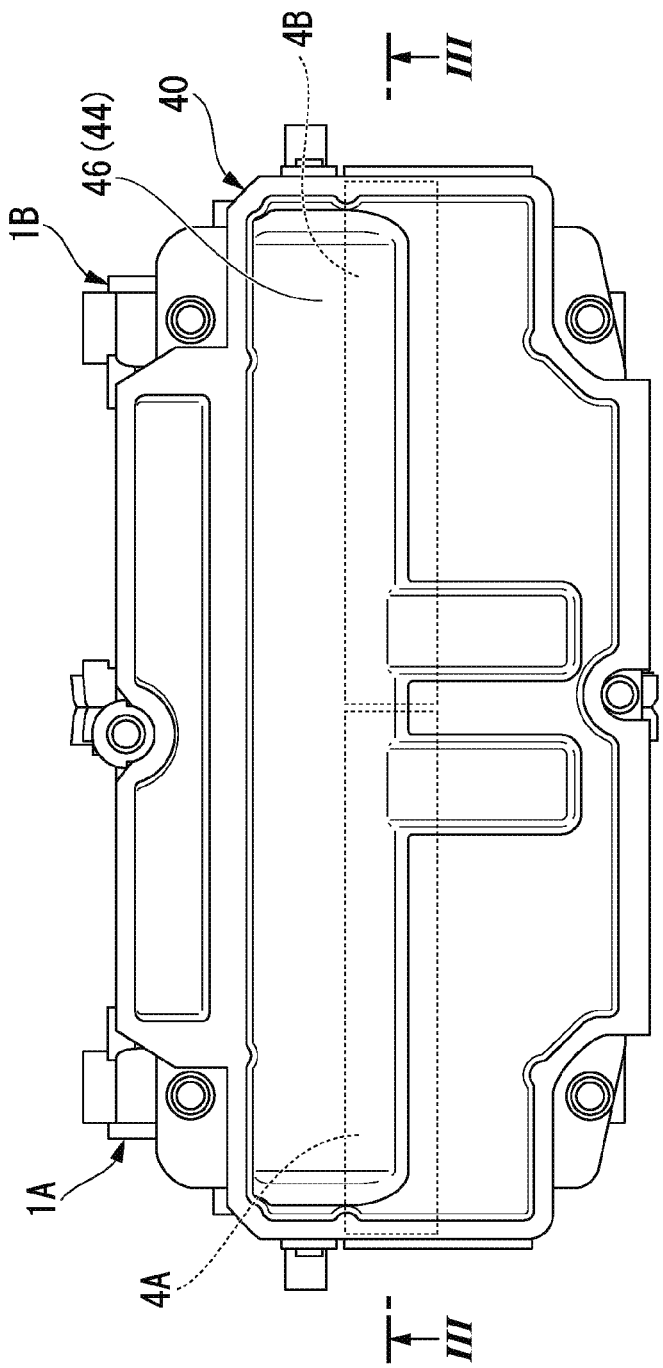
FIG. 2 is a top view of the motor unit according to the first embodiment.

The drive unit 40 covers the first rotary electrical machine 1A and the second rotary electrical machine 1B from above. In a top view, the drive unit 40 has a geometry that is larger than an axial length between the first rotary electrical machine 1A and the second rotary electrical machine 1B (a distance between an outer end of the first shaft 4A in the axial direction and an outer end of the second shaft 4B in the axial direction) (see FIG. 2).

As illustrated in FIG. 3, the drive unit 40 includes a circuit board 41 that constitutes a printed circuit board on which electronic parts are mounted, a capacitor 42 that is mounted on the circuit board 41, power modules 43A and 43B that supply power to the motor unit 100, and a housing 44 that houses the circuit board 41, the capacitor 42, and the power modules 43A and 43B.

The circuit board 41 has a plate shape extending in the axial direction.

The capacitor 42 is disposed in the middle of the drive unit 40 in the axial direction. The capacitor 42 is housed in a lower space of the circuit board 41 in the housing 44. A part (a lower end) of the capacitor 42 is disposed inside the swell 150.

The power modules 43A and 43B are provided across the capacitor 42 as a pair. The power modules 43A and 43B are housed in a lower space of the circuit board 41 in the housing 44. The pair of power modules 43A and 43B are a first semiconductor element 43A that supplies power to the first rotary electrical machine 1A, and a second semiconductor element 43B that supplies power to the second rotary electrical machine 1B. The first semiconductor element 43A faces the first rotary electrical machine 1A across the housing 44. The second semiconductor element 43B faces the second rotary electrical machine 1B across the housing 44.

The housing 44 includes a casing 45 that houses the circuit board 41, the capacitor 42, the first semiconductor element 43A, and the second semiconductor element 43B, and a covering lid 46 that is coupled to the casing 45 to cover an inner portion of the casing 45 from above.

<Swell 150>

The swell 150 is disposed at a position that faces the contact face 101 in the casing 45. The swell 150 swells from the middle of the lower portion of the casing 45 in the axial direction toward the joint between the first case 5A and the second case 5B. The swell 150 is provided between the first rotary electrical machine 1A and the second rotary electrical machine 1B in the axial direction. The swell 150 has a U-shaped geometry in a sectional view.

As described above, the motor unit 100 of the above embodiment includes the rotary electrical machine 1A (1B) that has the cylindrical stator 2A (2B), the rotor 3A (3B) disposed coaxially with the stator 2A (2B), the shaft 4A (4B) disposed coaxially with the rotor 3A (3B), and the cylindrical case 5A (5B) housing the stator 2A (2B) and the rotor 3A (3B), and the drive unit 40 that has the swell 150 that swells toward the case 5A (5B) and is fixed to a side of the case 5A (5B). The case 5A (5B) has the recess 151 that corresponds to the swell 150, and the refrigerant passage 152A (152B) that is disposed away from the recess 151 and cools the stator 2A (2B) from the inner circumferential surface of the case 5A (5B).

According to this constitution, the case 5A (5B) has the recess 151 that corresponds to the swell 150, and thereby the swell 150 (a part of the drive unit 40) can be incorporated with the case 5A (5B). Therefore, the motor unit 100 can be miniaturized. In addition, the case 5A (5B) has the refrigerant passage 152A (152B) that is disposed away from the recess 151 and cools the stator 2A (2B) from the inner circumferential surface of the case 5A (5B) and thereby, since the swell 150 can be incorporated with a portion other than the refrigerant passage 152A (152B) in the case 5A (5B), the motor unit 100 can be miniaturized while cooling the stator 2A (2B).

In the above embodiment, the joint between the first case 5A and the second case 5B has the recess 151 that corresponds to the swell 150, and thereby the swell 150 (a part of the drive unit 40) can be incorporated with the joint between the first case 5A and the second case 5B. Therefore, the motor unit 100 having the two rotary electrical machines 1A and 1B and the single drive unit 40 can be miniaturized.

In the above embodiment, the first case 5A has the first refrigerant passage 152A that cools the first stator 2A from the inner circumferential surface of the first case 5A, the second case 5B has the second refrigerant passage 152B that cools the second stator 2B from the inner circumferential surface of the second case 5B, and the first refrigerant passage 152A and the second refrigerant passage 152B are disposed away from the recess 151, and thereby the following effect is produced. Since the swell 150 can be incorporated with the portion other than the first refrigerant passage 152A in the first case 5A and the portion other than the second refrigerant passage 152B in the second case 5B, the motor unit 100 can be miniaturized while cooling the first stator 2A and the second stator 2B.

In the above embodiment, the swell 150 is provided between the first rotary electrical machine 1A and the second rotary electrical machine 1B in the axial direction, and thereby the first refrigerant passage 152A and the second refrigerant passage 152B are easily secured, compared to a case where the swell 150 is provided in the middle of the first rotary electrical machine 1A or in the middle of the second rotary electrical machine 1B in the axial direction. For this reason, the motor unit 100 can be miniaturized while cooling the first stator 2A and the second stator 2B.

In the above embodiment, the drive unit 40 includes the capacitor 42, a part of which is disposed inside the swell 150, and thereby the following effect is produced. Since the capacitor 42 has a high degree of shape freedom compared to other electronic components, the motor unit 100 is easily miniaturized.

Modification of the First Embodiment

In the aforementioned embodiment, the constitution in which the recess 151 is provided on the joint between the first case 5A and the second case 5B has been described, but it is not limited thereto. For example, the recess 151 may be provided in any one of the first case 5A and the second case 5B. For example, the recess 151 may be provided in the middle of the first case 5A or in the middle of the second case 5B in the axial direction. For example, the recess 151 may be provided on opposite ends of the motor unit 100 (an end of the first case 5A which is located on a side opposite to the second case 5B and an end of the second case 5B which is located on a side opposite to the first case 5A) in the axial direction. For example, the recess 151 may be provided on one end of the motor unit 100 (any one of the end of the first case 5A which is located on the side opposite to the second case 5B and the end of the second case 5B which is located on the side opposite to the first case 5A) in the axial direction. That is, the recess 151 may be provided at a position that corresponds to the swell 150 in at least one of the first case 5A and the second case 5B.

In the aforementioned embodiment, the constitution in which the swell 150 is provided between the first rotary electrical machine 1A and the second rotary electrical machine 1B in the axial direction has been described, but it is not limited thereto. For example, the swell 150 may be provided in the middle of the first rotary electrical machine 1A or in the middle of the second rotary electrical machine 1B in the axial direction. For example, the swell 150 may be provided on opposite ends of the motor unit 100 in the axial direction (to swell toward both an end of the first rotary electrical machine 1A which is located on a side opposite to the second rotary electrical machine 1B and an end of the second rotary electrical machine 1B which is located on a side opposite to the first rotary electrical machine 1A). For example, the swell 150 may be provided on one end of the motor unit 100 in the axial direction (to swell toward any one of the end of the first rotary electrical machine 1A which is located on the side opposite to the second rotary electrical machine 1B and the end of the second rotary electrical machine 1B which is located on the side opposite to the first rotary electrical machine 1A). That is, the swell 150 may swell from the drive unit 40 toward at least one of the first case 5A and the second case 5B.

In the aforementioned embodiment, the constitution in which the drive unit 40 includes the capacitor 42, a part of which is disposed inside the swell 150, has been described, but it is not limited thereto. For example, the entire capacitor 42 may be disposed inside the swell 150. That is, at least a part of the capacitor 42 may be disposed inside the swell 150.

For example, an electronic component other than the capacitor 42 may be disposed inside the swell 150. For example, no electronic component may be disposed inside the swell 150. For example, the swell 150 may be a convex of the housing 44 itself (the casing 45 itself).

In the aforementioned embodiment, the constitution in which the motor unit 100 is disposed along the shafts 4A and 4B in the horizontal direction has been described, but it is not limited thereto. For example, the motor unit 100 is disposed along the shafts 4A and 4B in a vertical direction. The disposition of the shafts 4A and 4B can be changed in an arbitrary direction depending on a design specification.

In the aforementioned embodiment, the constitution in which the coil is the SC winding has been described, but it is not limited thereto. For example, the coil may be a component other than the SC winding, such as a continuous winding.

Second Embodiment

Hereinafter, a second embodiment of the present invention will be described. In the second embodiment, the same components as in the first embodiment are given the same reference signs, and detailed description thereof will be omitted.

In the aforementioned first embodiment, the constitution in which the motor unit is the twin motor unit having the two rotary electrical machines has been described, but it is not limited thereto. For example, the motor unit may be a single motor unit having a single rotary electrical machine.

Figure 4:
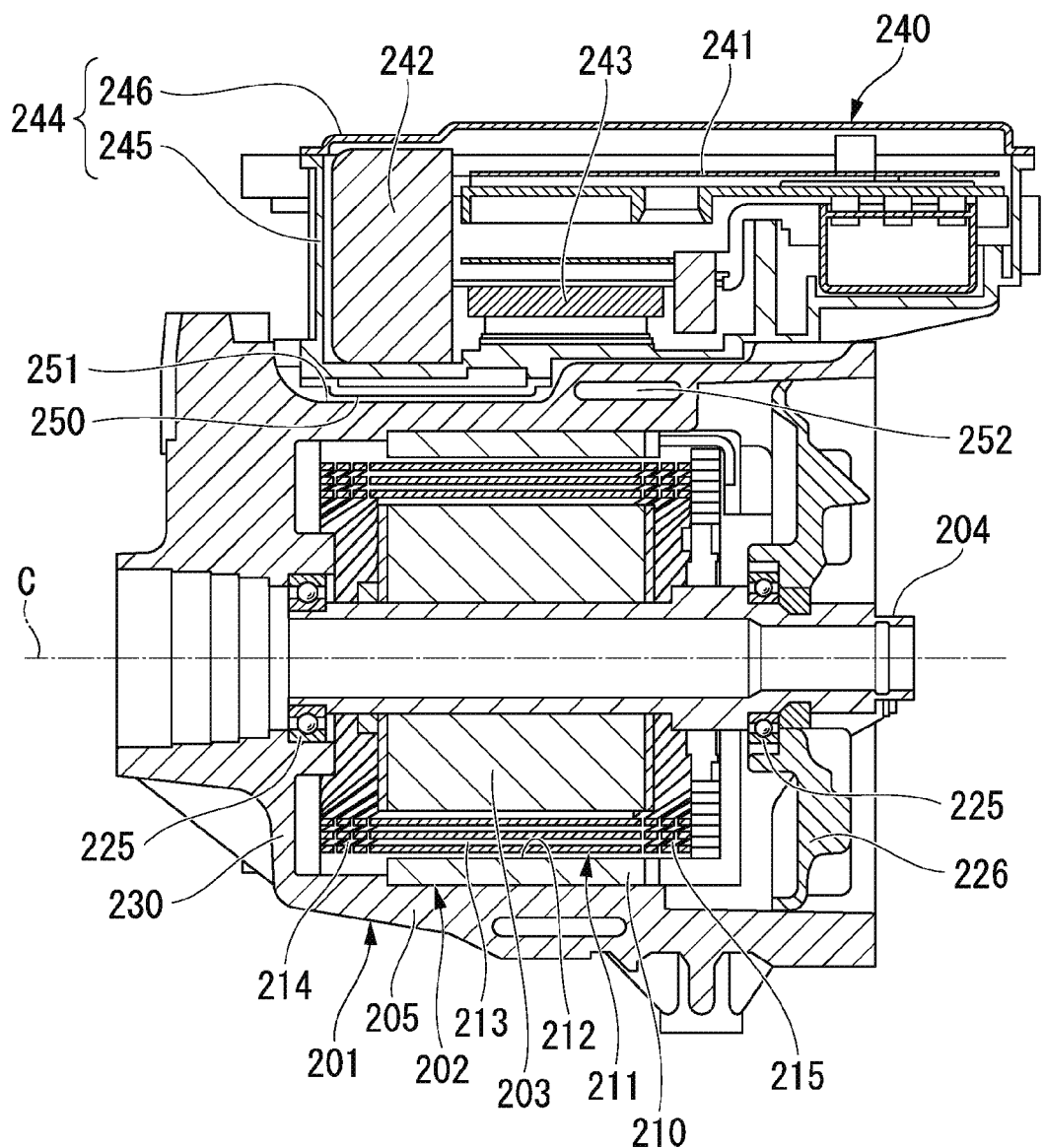
FIG. 4 is a sectional view illustrating a motor unit according to a second embodiment and corresponding to FIG. 3.

FIG. 4 is a sectional view illustrating a motor unit 200 according to a second embodiment and corresponding to FIG. 3.

As illustrated in FIG. 4, the motor unit 200 includes a single rotary electrical machine 201 and a drive unit 240.

The rotary electrical machine 201 includes a cylindrical stator 202, a rotor 203 that is disposed coaxially with the stator 202, a shaft 204 that is disposed coaxially with the rotor 203, and a cylindrical case 205 that houses the stator 202 and the rotor 203.

The stator 202 includes a cylindrical stator core 210 having a plurality of slots 212, and a coil 211 inserted into the slots 212. The coil 211 has inserts 213 that are inserted into the slots 212 of the stator core 210, a first coil end 214 that protrudes to one side of the stator core 210 in an axial direction, and a second coil end 215 that protrudes to the other side of the stator core 210 in the axial direction.

The case 205 includes an end wall 230 that is provided at one end of the shaft 204 and faces the first coil end 214 in the axial direction. In the drawing, a reference sign 225 indicates bearings that support opposite ends of the shaft 204 in the case 205 in the axial direction, and a reference sign 226 indicates a cover that is provided at the other end of the shaft 204 and covers the second coil end 15 in the axial direction.

The case 205 has a recess 251 that corresponds to a swell 250 of a drive unit 240, and a refrigerant passage 252 that is disposed away from the recess 251 and cools the stator 202 from an inner circumferential surface of the case 205.

The recess 251 is provided near an end of the rotary electrical machine 201 in the axial direction. The recess 251 is provided near the end wall 230. The recess 251 is formed to be across the middle of the stator core 210 and the first coil end 214 in the axial direction. The recess 251 is recessed in a U shape in a sectional view.

The refrigerant passage 252 is disposed at a position adjacent to the recess 251 in the axial direction. The refrigerant passage 252 is disposed along an outer circumferential surface of the stator core 210. For example, the refrigerant passage 252 is a water jacket.

The drive unit 240 is a single drive unit fixed to the rotary electrical machine 201. The drive unit 240 covers the rotary electrical machine 201 from above. The drive unit 240 is fixed to a side of the case 205 which is not located in the axial direction of the rotor 203 (a circumferential surface which is located in a radial direction of the rotor 203). For example, the drive unit 240 is fixed to the case 205 by fastening members such as bolts. The drive unit 240 has the swell 250 swelling toward the case 205.

The drive unit 240 includes a circuit board 241 that constitutes a printed circuit board on which electronic components are mounted, a capacitor 242 that is mounted on the circuit board 241, a power module 243 that supplies power to the motor unit 200, and a housing 244 that houses the circuit board 241, the capacitor 242, and the power module 243.

The circuit board 241 has a plate shape that extends in the axial direction.

The capacitor 242 is disposed at an end of the drive unit 240 in the axial direction. The capacitor 242 is housed at a position adjacent to the circuit board 241 in the housing 244 in the axial direction. A part (a lower end) of the capacitor 242 is disposed inside the swell 250.

The power module 243 is a power semiconductor element that supplies power to the rotary electrical machine 201. The power module 243 is housed in a lower space of the circuit board 241 in the housing 244. The power module 243 faces the rotary electrical machine 201 across the housing 244.

The housing 244 includes a casing 245 that houses the circuit board 241, the capacitor 242, and the power module 243, and a covering lid 246 that is coupled to the casing 245 to cover the inside of the casing 245 from above.

<Swell 250>

The swell 250 is disposed at a position that faces the rotary electrical machine 201 in the casing 245. The swell 250 swells from an end of the lower portion of the casing 245 in the axial direction toward a portion of the case 205 which is near the end wall 230. The swell 250 is provided near an end of the rotary electrical machine 201 in the axial direction. The swell 250 has a geometry that can be housed in the recess 251.

As described above, the motor unit 200 of the present embodiment includes the rotary electrical machine 201 that has the cylindrical stator 202, the rotor 203 disposed coaxially with the stator 202, the shaft 204 disposed coaxially with the rotor 203, and the cylindrical case 205 housing the stator 202 and the rotor 203, and the drive unit 240 that has the swell 250 swelling toward the case 205 and is fixed to the circumferential surface that is located in the radial direction of the rotor 203 and is the case 205. The case 205 has the recess 251 that corresponds to the swell 250.

According to this constitution, the case 205 has the recess 251 that corresponds to the swell 250, and thereby the swell 250 (a part of the drive unit 240) can be incorporated with the case 205. Therefore, the motor unit 200 can be miniaturized.

In the above embodiment, the case 205 further includes the refrigerant passage 252 that cools the stator 202 from the inner circumferential surface of the case 205, and the refrigerant passage 252 is disposed away from the recess 251. Thereby, the following effect is produced. Since the swell 250 can be incorporated with a portion other than the refrigerant passage 252 in the case 205, the motor unit 200 can be miniaturized while cooling the stator 202.

In the above embodiment, the swell 250 is provided near the end of the rotary electrical machine 201 in the axial direction, and thereby the refrigerant passage 252 is easily secured, compared to a case where the swell 250 is provided in the middle of the rotary electrical machine 201 in the axial direction. For this reason, the motor unit 200 can be easily miniaturized while cooling the stator 202.

In the aforementioned second embodiment, the constitution in which the recess 251 is provided near the end of the rotary electrical machine 201 in the axial direction has been described, but it is not limited thereto. For example, the recess 251 may be provided in the middle of the rotary electrical machine 201 in the axial direction. That is, the recess 251 may be provided at a position corresponding to the swell 250 in the case 205.

In the aforementioned second embodiment, the constitution in which the swell 250 is provided near the end of the rotary electrical machine 201 in the axial direction has been described, but it is not limited thereto. For example, the swell 250 may be provided in the middle of the rotary electrical machine 201 in the axial direction. That is, the swell 250 may swell from the drive unit 240 toward the case 205.

In the aforementioned embodiment, the example in which the rotary electrical machine is the driving motor mounted in the vehicle such as a hybrid vehicle or an electric vehicle has been described, but it is not limited thereto. For example, the rotary electrical machine may be a motor for power generation, a motor for another usage, or a rotary electrical machine (including a power generator) for the purpose other than a vehicle.

In the aforementioned embodiment, the example in which the cases (the first case and the second case) have the refrigerant passages been described, but it is not limited thereto. For example, the cases may have no refrigerant passages. For example, the motor unit may be cooled by oil cooling or water cooling of the inside of a motor.

While preferred embodiments of the present invention have been described, the present invention is not limited to the embodiments. Additions, omissions, substitutions, and other changes can be made without departing from the spirit or scope of the present invention, and the aforementioned modifications can be appropriately combined.

What is claimed is:

1. A motor unit comprising:
a first rotary electrical machine that has a first stator formed in a cylindrical shape, a first rotor disposed coaxially with the first stator, a first shaft disposed coaxially with the first rotor, and a first case that is formed in a cylindrical shape and that houses the first stator and the first rotor;
a second rotary electrical machine that has a second stator formed in a cylindrical shape, a second rotor disposed coaxially with the second stator, a second shaft disposed coaxially with the second rotor, and a second case that is formed in a cylindrical shape and that houses the second stator and the second rotor; and
a single drive unit configured to have a swell swelling toward at least one of the first and second cases and to be integrally fixed across a side of the first case and a side of the second case,
wherein the at least one of the first and second cases has a recess that corresponds to the swell.

2. The motor unit according to claim 1, wherein:
the first case further includes a first refrigerant passage that cools the first stator from an inner circumferential surface of the first case;
the second case further includes a second refrigerant passage that cools the second stator from an inner circumferential surface of the second case; and
the first and second refrigerant passages are disposed away from the recess.

3. The motor unit according to claim 1,
wherein
the first rotary electrical machine and the second rotary electrical machine are disposed coaxially with each other, and
the swell is provided between the first rotary electrical machine and the second rotary electrical machine in an axial direction.

4. The motor unit according to claim 1,
wherein the drive unit includes a capacitor, and at least a part of the capacitor is disposed in the swell.

* * * * *